United States Patent [19]
Franz

[11] Patent Number: 5,298,824
[45] Date of Patent: Mar. 29, 1994

[54] COVERING FOR ELECTRICAL MACHINES

[75] Inventor: Peter Franz, Diekholzen, Fed. Rep. of Germany

[73] Assignee: Robert Bosch GmbH, Stuttgart, Fed. Rep. of Germany

[21] Appl. No.: 852,170

[22] PCT Filed: Sep. 13, 1990

[86] PCT No.: PCT/EP90/00700
§ 371 Date: Apr. 2, 1992
§ 102(e) Date: Apr. 2, 1992

[87] PCT Pub. No.: WO90/13393
PCT Pub. Date: Nov. 15, 1990

[30] Foreign Application Priority Data
Oct. 24, 1989 [DE] Fed. Rep. of Germany ....... 3935299

[51] Int. Cl.$^5$ .............................................. H02K 5/00
[52] U.S. Cl. .................................... 310/89; 310/42; 310/45; 310/88; 310/91; 310/271; 29/447; 29/596; 53/442; 290/38 R; 290/48
[58] Field of Search ............... 310/42, 91, 88, 112, 310/271, 272, 45, 69, 69 A, 87, 233, 90; 74/6, 606 R; 29/447, 596; 53/442; 150/157; 206/497; 290/38 R, 48

[56] References Cited

U.S. PATENT DOCUMENTS

| | | | |
|---|---|---|---|
| 2,476,937 | 4/1993 | White | 310/45 |
| 2,774,894 | 12/1956 | Antonidis | 310/88 UX |
| 3,670,880 | 6/1972 | Burleson | 53/442 |
| 4,248,030 | 2/1981 | Heckman | 53/442 |
| 4,309,815 | 1/1982 | Schmitt | 310/42 |
| 4,626,724 | 12/1986 | Morishita | 310/88 |
| 4,729,160 | 3/1988 | Brown | 29/598 |
| 4,866,294 | 9/1989 | Johnston | 310/42 |
| 5,101,114 | 3/1992 | Isozumi | 310/89 |

FOREIGN PATENT DOCUMENTS

| | | |
|---|---|---|
| 887656 | 7/1949 | Fed. Rep. of Germany ........ 310/88 |
| 1348886 | 12/1964 | France . |
| 2436263 | 4/1980 | France . |
| 2496353 | 6/1982 | France . |
| 2111763 | 7/1983 | United Kingdom . |

OTHER PUBLICATIONS

Patent Abstracts of Japan, vol. 7, No. 128, 3 Jun. 1983 and JP-A-58 47155 18 Mar. 1983.

*Primary Examiner*—R. Skudy
*Attorney, Agent, or Firm*—Michael J. Striker

[57] ABSTRACT

A covering for electrical machines has at least one film which is placed around a pole housing and around parts attached to the pole housing and which is permanently shrunk onto the pole housing and the parts.

12 Claims, 3 Drawing Sheets

COVERING FOR ELECTRICAL MACHINES

BACKGROUND OF THE INVENTION

Electrical machines, in particular starter devices of internal-combustion engines, which are subjected to dirt and moisture during rugged use in motor vehicles, are sealed and protected against corrosion in a known manner, by dip varnishing. In this case, it is disadvantageous that the varnishing generally takes place in a dipping process using varnishes which inherently and during processing require costly environmental protection measures because of the risk of explosion and to prevent hazardous emissions. It is furthermore disadvantageous that the motor housing, drive bearing and commutator bearing have a certain elasticity in the case of clamping bolts or tie rods which hold starter devices together. For example, it is necessary to counteract the vibration influences during operation of the motor vehicle. However, the varnishes become brittle after a certain period of time and are then always breaking out of the separating joints on the end sides of the motor housing. The inside of the motor is no longer sealed, dirt and moisture can penetrate, and lead to damage in the motor. In addition, corrosion damage occurs at the joint sections where there is no varnish.

The same also applies in general to electrical machines having the same or similar construction, with corresponding seals which are used, for example, in motor vehicles as generators, as small motors for other units such as windscreen wipers or, for example, also as drive motors in electric tools.

An electric motor for a starter device is already known, with a rubber tube pushed a motor housing a rubber tube, and covering in a waterproof manner only the separating joints at the end sides of the motor housing on which the drive and commutator bearings are arranged. In this case, it is disadvantageous that the rubber tube is a complicated and expensive moulded part. Furthermore, the rubber tube is provided on one end with a radially inwardly projecting holder and a hole through which a braided power supply cable is pushed. In addition, the rubber tube has annular inner shoulders distributed over its complete length, in order to serve as impact protection for the motor housing and the permanent magnets which are bonded to its inner wall.

SUMMARY OF THE INVENTION

Accordingly, it is an object of the present invention to provide a covering for electrical machines which avoids the disadvantages of the prior art.

More particularly, it is an object of the present invention to provide a covering for electrical machines which has improved the moisture sealing and corrosion resistance and is executed with the aid of simple and environmentally friendly means suitable for economical mass production.

In keeping with these objects and with others which will become apparent hereinafter, one feature of the present invention resides, briefly stated, in a sealing covering for electrical machines which has at least one film place around the pole housing and around parts attached to the pole housing, and permanently shrunk onto the covered parts.

When the covering is designed in accordance with the present invention, it is advantageous that shrunk-on films permit improved corrosion protection and permanent sealing of the electrical machine. Furthermore, costs and installation complexity for the sealing covering, constructed as a film, are significantly reduced. It is also primarily advantageous in comparison with varnishes that the factors which are harmful to the environment, together with the consequential costs, can be almost completely avoided. Residual materials which are harmful to the environment can be collected and passed to recycling processes.

In a particularly advantageous manner, a low-cost section of a pocket-shaped part of a shrink sleeve can be pushed or drawn onto the electrical machine and then shrunk on. The film which is used as the covering can also be provided with prestampings corresponding to the external shape of the electrical machine. After covering, the film edges are attached to one another before the film is shrunk. Prestamped halves, which can be placed around the complete starter device, are attached to one another at their edges and are then shrunk so that no special sealing is required for the power supply cable where it passes out from the starter motor housing. They are suitable in a particularly advantageous manner for starter devices for internal-combustion engines having an electromagnetic switch constructed on the side on the starter motor housing and a power supply cable between the starter motor and the switch. As a result of the firm bonding of the shrunk film onto the covered parts, the electrical machine is also furthermore protected in the event of damage to the covering, because the film does not peel off and cannot be pulled off. In addition, the elasticity of the covering meets the requirements for vibration protection in rugged use in motor vehicles, to which the starter devices are subjected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
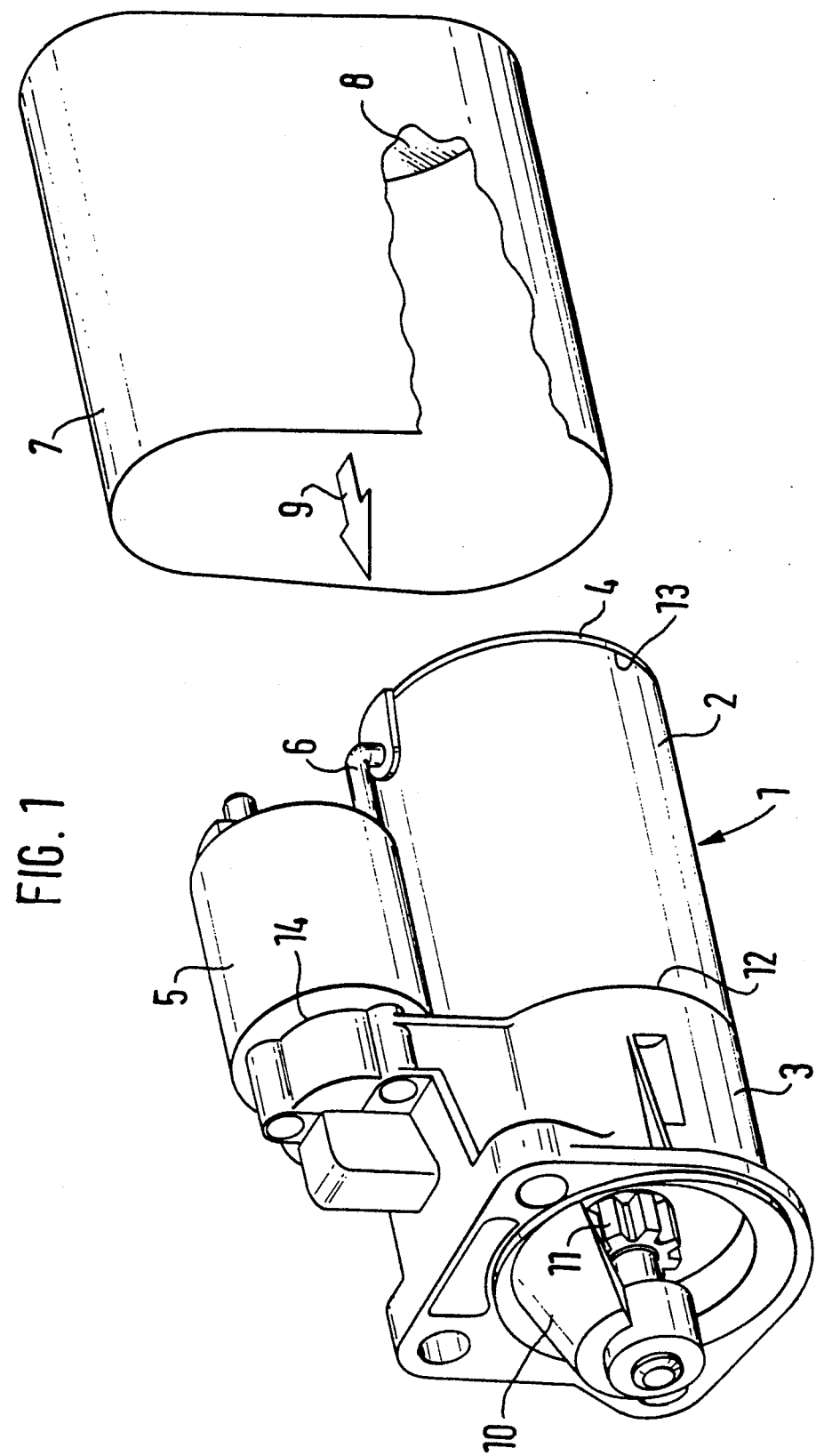
FIG. 1 shows a starter device having an electromagnetic switch constructed on the side of the starter motor and a first exemplary embodiment of the film as a pocket.

Sealing coverings for starter devices are described as an exemplary embodiment of the invention, since they are examples of particularly complicated external shapes.

A starter device has a starter motor 1 with a pole housing 2. A drive bearing 3 and a commutator bearing 4 are attached to the end sides of the pole housing. An electromagnetic switch 5 is arranged on the side on the pole housing 2 and is attached to the drive bearing 3. A power supply cable 6 passes from the switch 5 to the starter motor 1. A pocket-shaped film 7, which is suitable for shrinking, having an approximately egg-shaped circumference and a base 8 is pushed or drawn in the direction of the arrow 9 from the commutator bearing side onto the starter device, so that it covers the starter device except for the mouth-like projection 10 of the drive bearing 3, which surrounds the drive pinion 11. The pocket-shaped film 7 is subsequently shrunk onto the starter device. The pocket-shaped film then securely covers the separating joints 12 and 13 on the end sides of the pole housing 2 to the drive bearing 3 and to the commutator bearing 4 as well as the separating joint 14 between the drive bearing 3 and the electromagnetic switch 5. The power supply cable 6, which is already mounted on the starter motor 1 and on the electromagnetic switch 5, its connection point to the switch 5 and, above all, its outlet opening from the pole housing 2 are also securely protected by the base 8 of the pocket-shaped film 7.

If the film can be bonded, after shrinking it is firmly seated on the covered starter device without points being damaged, for example during transportation, by peeling off or being able to be pulled off.

Figure 2:
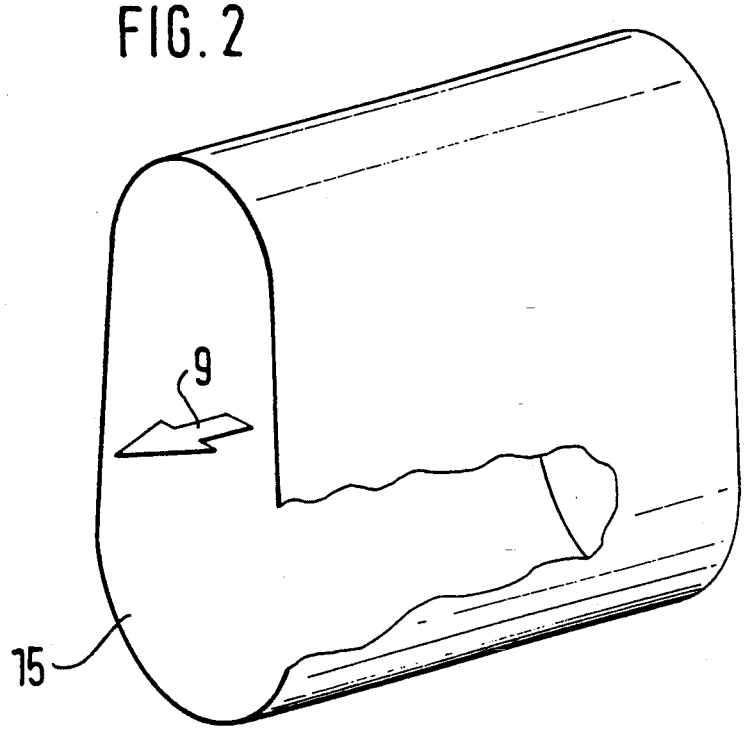
FIG. 2 shows a second exemplary embodiment of the film, as a tubular section of a shrink sleeve.
Figure 3:
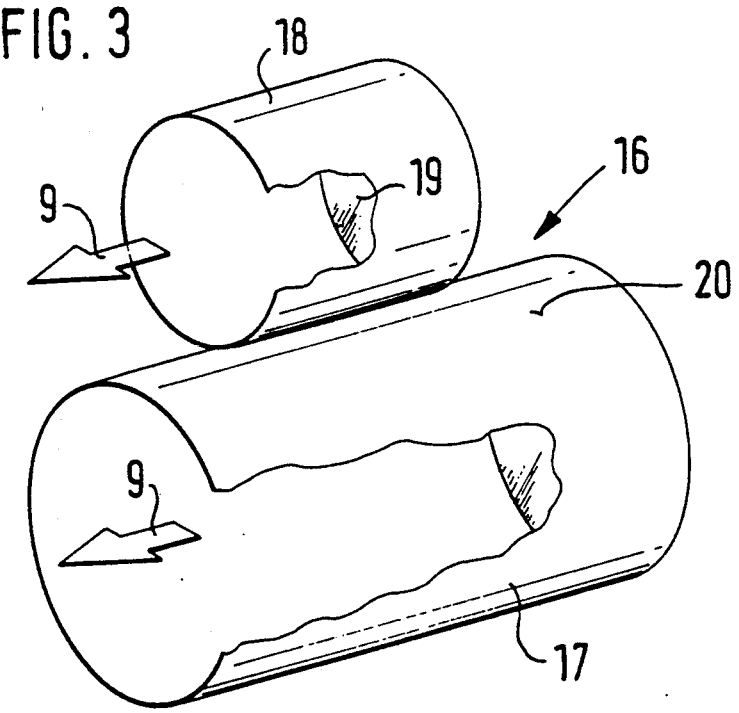
FIG. 3 shows a third exemplary embodiment of the film formed from two pocket-shaped parts.

In the second exemplary embodiment, shown in FIG. 2, the film is constructed as a tubular section 15 of an intrinsically shapeless shrink sleeve and is once again incapable of being pushed or drawn in the direction of the arrow 9 from the commutator bearing 4 onto the starter de as in the exemplary embodiment according to FIG. 1. It then covers the starter motor 1 together with the drive and commutator bearings 3 and 4, as well as the electromagnetic switch 5, in order to enclose the starter device in a secure protective manner after subsequent shrinking.

As a third exemplary embodiment of the film 16, two pocket-shaped films 17 and 18, of circular cross-section, are constructed with a diameter matched to the diameter of the pole housing 2 or of the diameter of the switch 5 and with a length provided to correspond to the starter motor 1 and the switch 5. They are connected to form a prefabricated unit, approximately in the shape of a figure eight. The pocket-shaped film 18 is attached to the outer jacket 20 of the film 17, set back so far from the open edge of the pocket-shaped film 17 that, in the state when it is drawn completely onto the starter device, the film 18 covers the switch 5 and the film 17 of the starter motor 1. The figure-eight-shaped film 16, 17, 18 is then, in turn, shrunk onto the starter device. In this case, the film 16 to 18 can likewise be firmly bonded onto the starter device.

The power supply cable 6 (FIG. 1) which passes between the starter motor 1 and the electromagnetic switch 5 can, for example, not be connected to the switch 5 until the figure-eight-shaped film 16 to 18 has been drawn or shrunk on. Before drawing or shrinking on the film 16 to 18, an opening or a slot can also be constructed (in a manner which is not shown in any more detail) in the base 19 of the pocket-shaped film 17, through which opening or slot the end of the Dower supply cable 6 passing to the switch 5 projects. Its other end already is connected to the starter motor 1.

The pocket-shaped films 17 and 18 can also be separated and drawn or pushed on individually, to be precise successively or simultaneously.

The figure-eight-shaped film 16 can be formed in a modified form from two tubular films which are in turn attached to one another. The tubular films can also be drawn or pushed onto the starter motor 1 and the electromagnetic switch 5 individually, successively or simultaneously, before they are shrunk.

Figure 4:
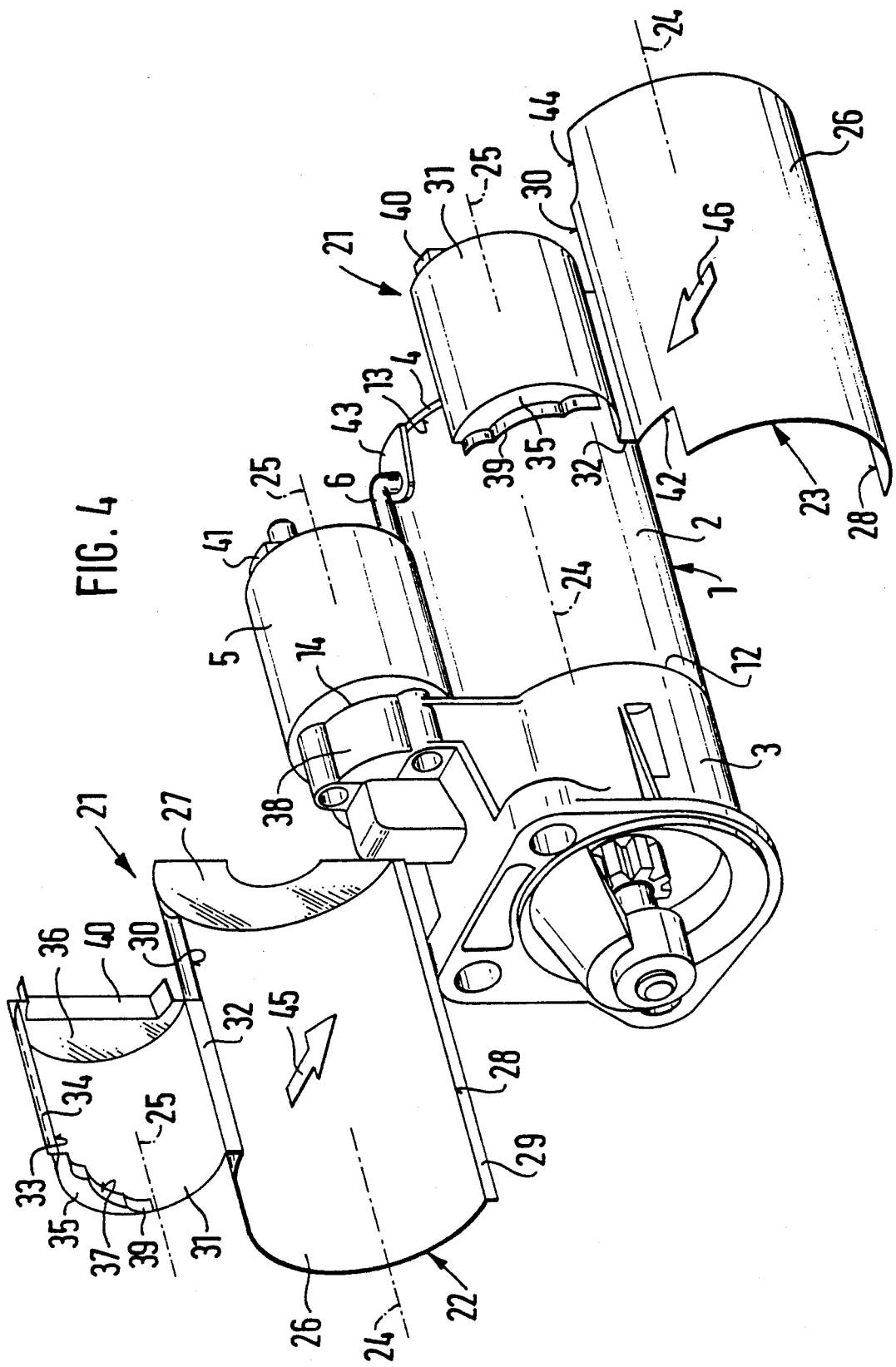
FIG. 4 shows the starter device and a fourth exemplary embodiment of the film, formed from two moulded parts. The starter device and all the exemplary embodiments of the film are shown in a three-dimensional representation before fitment of the film to the starter device.

A fourth exemplary embodiment is shown in FIG. 4. The starter device is once again identical to that of the first exemplary embodiment according to FIG. 1, and is thus provided with the same reference numbers.

A film 21 for covering the starter device consists of two premoulded halves 22 and 23 which are identical, in mirror-image form. In this case, the separating line runs in the plane in which the longitudinal axis 24 of the starter motor 1 and the longitudinal axis 25 of the electromagnetic switch 5 lie. Each half 22, 23 is formed from a first half-cylindrical section 26 on whose one end side a half-annular-disc-shaped inner shoulder 27 is integrally formed. The section 26 is matched to the circumference of the starter motor 1 and has a length which extends beyond the end sides of the pole housing 2 of the starter motor 1. A bonding edge 29 is formed on the lower longitudinal edge 28 of at least one half 22 or 23. A second half-cylindrical section 31 is integrally formed above a strip-shaped web 32, on the upper longitudinal edge 30 of each half 22 and 23. The second section 31 is matched to the diameter and to the length of the electromagnetic switch 5. At least the one longitudinal edge 33 of the second section 31 of the halves 22 or 23 is likewise provided with a bonding strip 34 or is constructed as a bonding strip. The second section 31 is provided on its end sides-with inner shoulders 35 and 36. The inner edge 37 of the inner shoulder 35 is matched to the external shape of the drive bearing 3 in the region 38, to which the electromagnetic switch 5 is attached, and is provided with a flange 39 which projects outwards at right angles to the end side. The inner annular shoulder 36 is provided with an edge section 40, which likewise extends outwards at right angles and is matched to the external shape of projections 41 on the end side of the switch 5, to which the power supply cable 6 passes. A recess 42, corresponding to the external shape of the drive bearing 3 at this point, is constructed on the upper longitudinal edge 30 of the first section 26, on the end section projecting over the separating joint 12 between the pole housing 2 and the drive bearing 3. In addition, a recess 44, matched to a duct 43 of the power supply cable 6, is constructed from the other end side of the first section 26 on the upper longitudinal edge 30.

The two halves 22 and 23 are laid on their sides around the starter device, in the direction of the arrows 451, 46. The bonding edges 29, 34 are glued to the edges of the opposite halves or are bonded to the edge sections at 30 and 33. The film 21, which thus covers the starter device, is then shrunk onto the starter device.

Instead of the recess 44, the upper longitudinal edge 30 of the one first section 26 can be omitted, while a flap having a bonding edge is constructed instead of the recess 44 of the other first section 26. The flap overlaps the upper longitudinal edge 30, without the recess 44, when the halves 22 and 23 are joined together, and is glued thereto. At the same time it also securely covers the power supply cable 6 and its outlet point from the pole housing 2.

As a modification of the film 21 of the fourth exemplary embodiment according to FIG. 4, the film is constructed integrally as a prestamped envelope, covers the parts 2 to 5, is bonded together with the bonding edge 29 on the opposite lower longitudinal edge and is shrunk onto the covered parts 2 to 5.

The film can also be bonded to the covered parts 2 to 5 before shrinking in the case of this embodiment, as in the case of all the previously described exemplary embodiments. In the case of possible damage to the film, it cannot be drawn off the covered parts so that it continues to protect the covered parts against the ingress of dirt and moisture, and against corrosion.

It will be understood that each of the elements described above, or two or more together, may also find a useful application in other types of constructions differing from the types described above.

While the invention has been illustrated and described as embodied in a protective cladding for electrical machinery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electrical machine, comprising a pole housing with parts attached to said pole housing; and at least one film which is placed around said pole housing and said parts and is firmly shrunk onto both the pole housing and the parts to form a single protective covering.

2. An electrical machine as defined in claim 1, wherein said film is constructed as a pocket which is pushed onto the pole housing and the parts and firmly shrunk thereon.

3. An electrical machine as defined in claim 1, wherein said film is formed as a section of a tubular shrink sleeve which is drawn onto the pole housing and the parts and firmly shrunk thereon.

4. An electrical machine as defined in claim 1, wherein said film is formed as a prestamped envelope corresponding to the pole housing and the parts and covering the pole housing and the parts, said envelope having overlapping edges which are attached to one another and being shrunk onto the pole housing and the parts.

5. An electrical machine as defined in claim 1, wherein said film is formed as a prestamped halves corresponding to the pole housing and the parts and placed around the pole housing and the parts, said halves being attached to one another and shrunk onto the pole housing and the parts.

6. An electrical machine as defined in claim 1, wherein said film is formed as a shrunk-on film which is firmly bonded to the pole housing and the parts.

7. An electrical machine as defined in claim 1, wherein the electrical machine is a starter motor, and the parts attached to the pole housing include and drive with commutator bearings, and electromagnetic switch, a power supply cable passing between the starter motor and the switch, said at least one film being shrunk on the starter motor, the pole housing the drive and commutator bearings, said electromagnetic switch and the power supply cable.

8. An electrical machine as defined in claim 7, and further comprising at least one further film, one of said films being pocket shaped and drawn and firmly shrunk onto the starter motor together with the drive and commutator bearings, while another of said films is drawn and firmly shrunk onto the switch.

9. An electrical machine as defined in claim 7, wherein said film has a section of a first tubular shrink sleeve which is onto the starter motor together with the drive and the commutator bearings and another section which is drawn onto the switch, both said sections being firmly shrunk on.

10. An electrical machine as defined in claim 8, wherein said one pocket shaped film is formed as a prefabricated unit before being drawn on.

11. An electrical machine as defined in claim 9, wherein said sections of said tubular shrink sleeve are formed each as a prefabricated unit before being drawn on.

12. A method of covering electrical machines, comprising providing at least one film; placing the film around a pole housing and parts attached to the pole housing of an electrical machine; and permanently shrinking the film on both the pole housing and the parts to form a single protective covering.

* * * * *